Sept. 11, 1962 M. CAMRAS 3,053,939

ELECTROMAGNETIC TRANSDUCER HEAD

Filed Feb. 23, 1954 5 Sheets-Sheet 1

Inventor
Marvin Camras
by Hill, Sherman, Meroni, Gross & Simpson Attys

ELECTROMAGNETIC TRANSDUCER HEAD

Filed Feb. 23, 1954 5 Sheets-Sheet 2

Inventor
Marvin Camras by Hill, Sherman, Meroni, Gross & Simpson Attys

Sept. 11, 1962 M. CAMRAS 3,053,939

ELECTROMAGNETIC TRANSDUCER HEAD

Filed Feb. 23, 1954

5 Sheets-Sheet 3

Inventor
Marvin Camras
by Hill, Sherman, Meroni, Gross & Simpson Attys

Inventor
Marvin Camras
by Hill, Sherman, Meroni, Gross & Simpson Attys

Inventor
Marvin Camras
by Hill, Sherman, Meroni, Gross & Simpson Attys

United States Patent Office 3,053,939

Patented Sept. 11, 1962

3,053,939

ELECTROMAGNETIC TRANSDUCER HEAD

Marvin Camras, Chicago, Ill., assignor to Armour Research Foundation of Illinois Institute of Technology, Chicago, Ill., a corporation of Illinois Filed Feb. 23, 1954, Ser. No. 411,608
13 Claims. (Cl. 179—100.2)

This invention relates to an electromagnetic transducer device and particularly to such a device for reproducing a signal recorded on a magnetic record medium.

It is an object of the present invention to provide a novel electromagnetic transducer head.

It is an additional object of the present invention to provide a transducer head capable of responding to D.-C. flux, infinite wavelengths, or zero speed of a magnetic record medium.

It is a further object of the present invention to provide a transducer head with an efficient magnetic circuit for maximum sensitivity.

It is another object of the present invention to provide a transducer assembly that is relatively insensitive to stray fields and is easily shielded.

It is still another object of the present invention to provide a compact unitary transducer structure requiring little or no additional amplification to operate a speaker or an indicating instrument.

It is yet another object of the present invention to provide a transducer head of high stability with respect to operating voltages, aging and the like.

It is a still further object of the present invention to provide a transducer head having a non-linear response characteristic such as a logarithmic response.

It is another and still further object of the present invention to provide a head having both transducing and amplifying properties.

Other and further important objects of this invention will be apparent from the disclosures in the specification and the accompanying drawings.

On the drawings:

FIGURE 32 is a diagrammatic cross sectional view taken substantially along the line XXXII—XXXII of FIG. 31;

FIGURE 33 is a diagrammatic view of the pole pieces utilized in the embodiment of FIGURE 31;

FIGURE 34 is a diagrammatic cross sectional view similar to FIGURE 32, but illustrating the use of half round anodes instead of the rectangular anodes shown in FIGURE 32;

FIGURE 35 is a diagrammatic longitudinal sectional view of a further type of electron-cloud transducer head having a constricted portion for receiving the pole piece construction;

FIGURE 36 illustrates a still further modified form of transducer head construction;

FIGURE 37 is a diagrammatic illustration of a microphone design using an electron-cloud tube as the transducing element;

FIGURE 38 is a diagrammatic end elevational view of the structure of FIGURE 37;

FIGURE 39 is a diagrammatic illustration of a device employing an electron-cloud tube as the transducing element and suitable as a phonograph pick-up, vibration pick-up, or the like;

FIGURE 40 is a diagrammatic horizontal sectional view of a reflection type electron-cloud transducer head according to the present invention;

FIGURE 41 is a diagrammatic vertical sectional view of the structure of FIGURE 40 and illustrating the manner in which the magnetic field is applied to the reflected stream of electrons;

FIGURE 42 is a diagrammatic horizontal sectional view similar to FIGURE 40 but illustrating a modified form of pole piece construction and illustrating the reflected stream of electrons as being deflected toward one of the anodes;

FIGURE 43 is a diagrammatic end elevational view illustrating the cooperation of the pole piece structure of FIGURE 42 with the capillary portion of the tube; and FIGURE 44 is a diagrammatic horizontal sectional view of a further form of reflected type transducer head wherein the "reflected" stream of electrons is produced by secondary emission.

As shown on the drawings:

Figures 1, 2, 3, 4, 5:
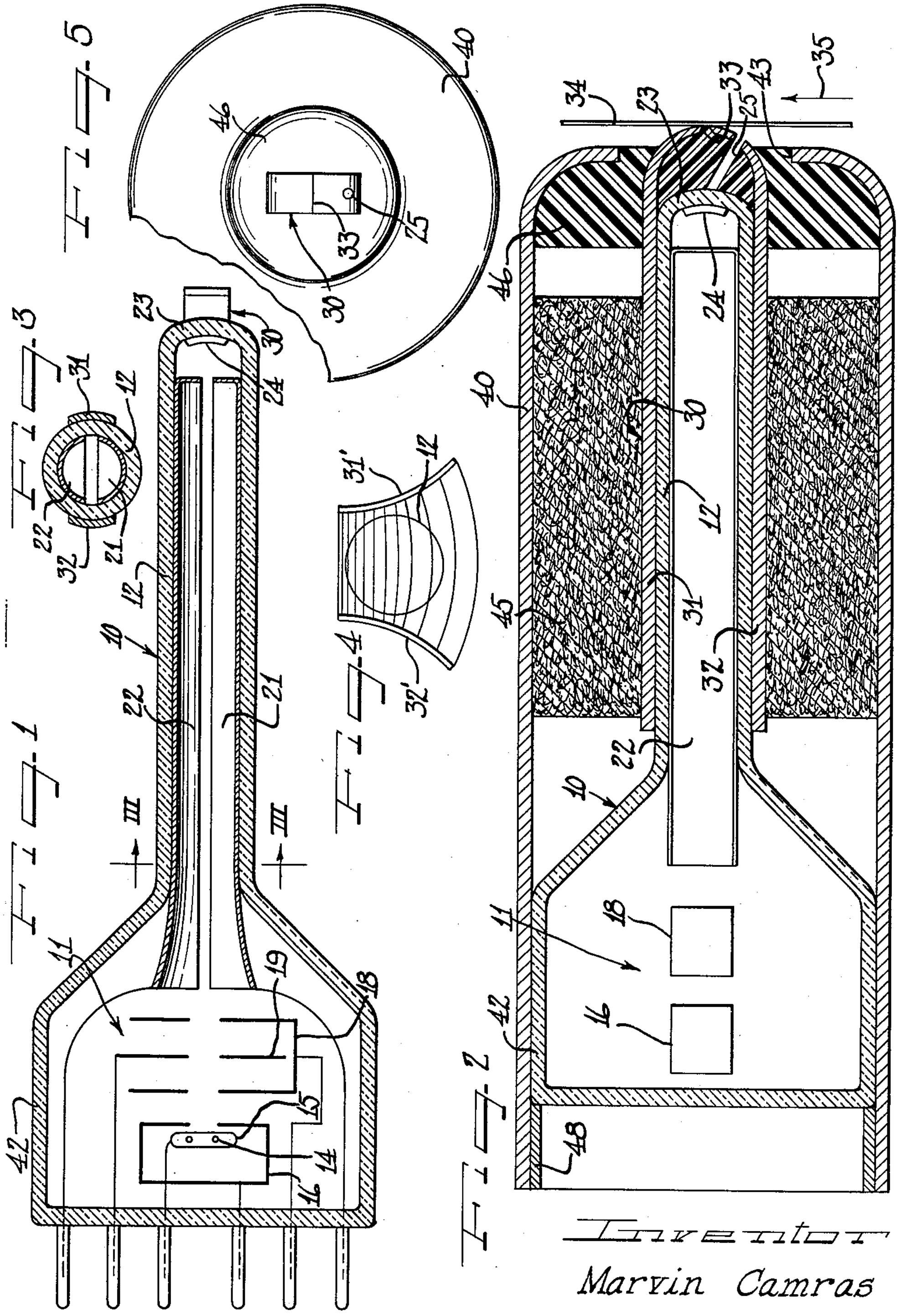
FIGURE 1 is a somewhat diagrammatic longitudinal sectional view of an electromagnetic transducer head according to the present invention.
FIGURE 2 is a somewhat diagrammatic longitudinal sectional view of the structure of FIGURE 1 but taken in a plane at right angles thereto.
FIGURE 3 is a transverse sectional view taken substantially along the line III—III of FIG. 1.
FIGURE 4 is a diagrammatic transverse sectional view of the transducer head of FIG. 1, but illustrating diagrammatically a modified pole piece configuration for providing a logarithmic characteristic response.
FIGURE 5 is an end elevational view of the structure of FIG. 2.

A magnetic transducer device according to the present invention has been illustrated in FIGURES 1 and 2 as comprising an evacuated envelope 10 having an electron gun structure 11 for establishing a stream of electrons in a restricted capillary section 12 of the tube. By way of example, the electron gun structure may include a filament 14, cathode 15, first grid and heat shield 16, accelerating grids 18 and focusing grid 19.

A pair of target electrodes 21 and 22 preferably extend along the length of the capillary section 12 of the tube on opposite sides thereof and serve as target anodes for the electron beam. The closed end of the tube 23 may have a phosphor indicating coating 24 thereon and an aperture 25, FIGURE 2, for observing the beam and thus facilitating adjustments thereof. The electrodes 21 and 22 may comprise non-magnetic hollow semi-cylinders generally in the form of troughs. Suitable materials for the electrodes are copper, tantalum, molybdenum and the like. The troughs 21 and 22 may be coated with carbon black to reduce secondary emission.

For defining a magnetic field transverse to the stream of electrons flowing between the electrodes 21 and 22, a core 30 is provided which has a pair of pole pieces 31 and 32 extending on the exterior of the capillary section 12 of the envelope and generally on opposite sides of the electrodes 21 and 22. For applying a signal flux to the pole pieces 31 and 32, the core may be provided with a non-magnetic gap 33 adapted to receive a magnetized record member 34 thereacross moving in the direction of the arrow 35. The reluctance of the gap 33 is selected to be of the order of magnitude of the reluctance of the gap between the pole pieces 31 and 32, FIGURE 2. For example, the capillary portion of the tube 10 may have an outside diameter of 2 millimeters or 80 mils (1 mil=0.001 inch). The length of the capillary section may be approximately 1500 mils, while the gap 33 may be 0.5 mil. On this basis, the reluctance of the gap may be 0.00125, while the reluctance of the path between the pole pieces 31 and 32 in comparable units may be 0.000667. The pole pieces may be of a Mumetal from 5 to 15 mils thick, or may comprise laminations made from thinner stock or a suitable ferrite core may be used, depending on the upper frequency response desired.

As indicated in FIGURE 3, the poles 31 and 32 may be shaped to give a more uniform field by turning the longitudinal edges of the poles inwardly slightly to counteract for the fall of the flux at the edges due to fringing. The configuration of the poles can be varied in accord with the response characteristics desired. For example, a logarithmic characteristic response is obtained by a shape of the poles such as indicated in FIGURE 4 at 31' and 32'. The pole pieces can also be shaped in the longitudinal direction, for example as indicated in FIGURE 6 at 31'' to give best efficiency of beam deflection.

For isolating the tube 10 from external fields, a shield of magnetic material 40 may be provided. The enlarged portion 42 of the tube extends in close fitting relation to one end of the shield, and the shield has an aperture 43 through which the end of the core 30 having the gap 33 projects for contact with the record member 34. The pole pieces 31 and 32 are preferably separated from the envelope 10 and independently supported and damped to prevent microphonics, damping material 45 being provided for this purpose along with the non-magnetic pole piece support filler 46. The electron tube envelope 10 may be separated from the poles and shield for replacement and may be secured with the shield by means of a sleeve 48, indicated in FIGURE 2 as being locked into the shield 40 to retain the envelope with the shield.

Figures 6, 7, 8, 9, 10, 11, 12, 13, 14:
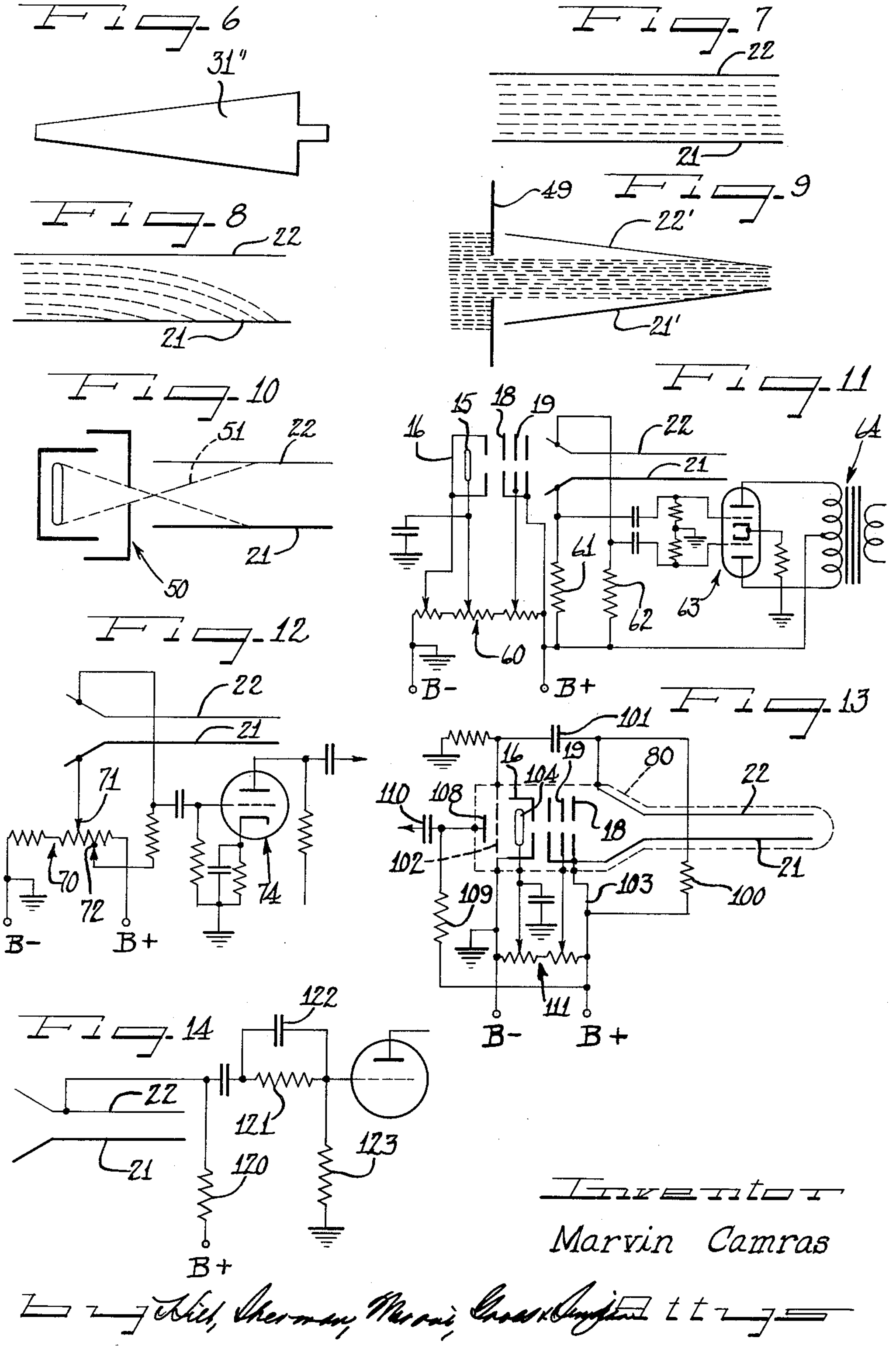
FIGURE 6 is a diagrammatic side elevational view of a modified pole piece configuration for improving the efficiency of beam deflection.
FIGURE 7 is a diagrammatic side elevational view indicating the stream of electrons between the target anodes in the absence of an applied magnetic field.
FIGURE 8 is a diagrammatic view similar to FIG. 7, but illustrating the beam under the influence of a high play-back magnetic field.
FIGURE 9 is a diagrammatic view similar to FIG. 7, but illustrating the situation with converging target anodes.
FIGURE 10 is a diagrammatic view similar to FIG. 7 and illustrating the case of a divergent stream of electrons between the target anodes.
FIGURE 11 illustrates a push-pull type circuit suitable for sensing the effect of a magnetic signal on the stream of electrons between the target anodes.
FIGURE 12 illustrates a single-ended circuit for sensing the effect of the signal flux on the stream of electrons.
FIGURE 13 illustrates a circuit for the transducer-amplifier head of the present invention.
FIGURE 14 illustrates a high frequency equalizer circuit connected between the transducer head and the first amplifier stage in accordance with the present invention.

FIGURES 7 and 8 illustrate the principle of operation of the illustrated embodiment. As indicated in FIGURE 7, when no field is applied to the pole pieces 31, 32 the cloud of electrons between the anodes 21 and 22 is generally evenly distributed between the two electrodes; however, as indicated in FIGURE 8, with the application of a field from the magnetic pole pieces, the cloud of electrons has a net drift to one or the other of the anodes, here to anode 21. Sensitivity is greater when a lower voltage is applied to the anodes than to the accelerating grids 18. In this case, a decelerating action is provided creating slower moving electrons in the region of deflection.

As illustrated in FIGURE 9 at 21', 22' the anodes can be converging within limits, without seriously affecting the operation; similarly, the anodes can also be diverging. The reference numeral 49 indicates baffle plates for controlling the non-deflected position of the beam in the region between converging electrodes 21', 22'.

Alternatively, as illustrated in FIGURE 10, a source 50 of a divergent beam of electrons indicated at 51, may be utilized with the electrodes 21 and 22. It can be shown that the change caused by a deflection of a divergent beam is independent of the angle of divergence, giving excellent stability. The diverging beam gives stability at the expense of sensitivity, but sensitivity is more than ample with this type head in most applications. It can also be shown that the angle of the electrodes, within limits, will not change the sensitivity as long as the electrodes intercept the beam, and the beam does not deflect on or off completely during operation. The sensitivity of the illustrated device is, therefore, very stable. Some factors controlling sensitivity are the sharpness of the cone of the beam, the amount of beam current, accelerating voltage in the deflection region (before deflection), and the degree of concentration of the field in the most effective region for deflection.

In FIGURE 11 is illustrated a push-pull circuit for receiving the output from the electrodes 21 and 22. In this case, the various grid voltages are taken from a voltage divider 60 with the anode voltages applied to the electrodes 21 and 22 through resistors 61 and 62, so as to be less than the accelerating voltage on grids 18. The output from the electrodes 21 and 22 is fed into the push-pull circuit 63 and the resultant output is taken from the secondary of transformer 64. In some cases because of secondary emission effects it may be desirable to operate electrodes 21 and 22 above the potential of 18. This is readily accomplished by feeding 61 and 62 from a separate source of higher B+ than the supply used for 18.

In FIGURE 12, is illustrated a single ended circuit wherein the unused target electrode 21 is kept at 20 or more volts negative with respect to the target electrode 22 for reduction of secondary emission effects. This is accomplished by means of the potential divider 70 in cooperation with the movable contacts 71 and 72 connecting with the two electrodes 21 and 22. The output from anode 22 is applied to the single ended amplifier circuit 74. The circuit may be balanced by initially directing the beam so as to favor electrode 21, for example by tilting the gun, or by auxiliary electrodes, or by magnetic deflection, or by bending or curving the capillary.

FIGURE 13 illustrates a circuit including a stage of amplification built into the head tube 80, which is otherwise similar to the tube 10. Here, the high voltage from B+ is supplied through the resistor 100 to the target electrode 22 and variations in the flow of electrons to the electrode 22 is transmitted through the condenser 101 to the grid 102 of the amplifying stage within the tube. The electrode 21 is connected directly to B+ through the conductor 103. The cathode 104 supplies electrons both for the capillary end of the tube and for the amplifying stage including the grid 102 and plate 108 which is supplied with voltage from the B+ supply through a resistor 109. The output is taken through a condenser 110. The accelerating and focusing voltages are taken off the voltage divider 111, similarly to the previous circuits. As previously described the supply voltage to resistor 100 may be from a higher B+ than the other electrodes, so as to operate anode 22 at an equal or higher voltage than anode 21.

FIGURE 14 indicates a high frequency equalizer circuit in the input stage from the electrode 22, the B+ supply being furnished through a resistor 120 and the output being taken through a single ended circuit similar to that of FIGURE 12, but including a resistor 121 having a condenser 122 in parallel therewith and fed into a resistor 123 for boosting the high frequency output from the tube. It is desirable to have the high frequency equalization before electronic amplification to improve the signal to noise ratio at high frequencies. The fall-off at high frequencies is caused by gap effects, reduced capability of the tape to retain high frequencies, and the like. The head of the present invention is directly responsive to flux, rather than to the rate of change of flux, as in induction type pick-up devices.

Figure 15:
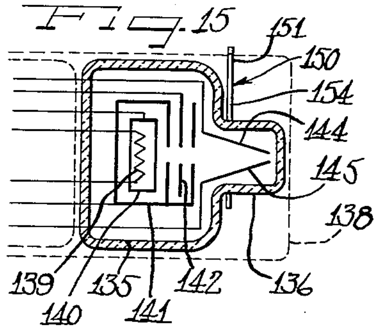
FIGURE 15 is a somewhat diagrammatic longitudinal sectional view illustrating a first form of a short type electronic transducer head according to the present invention.
Figure 16:
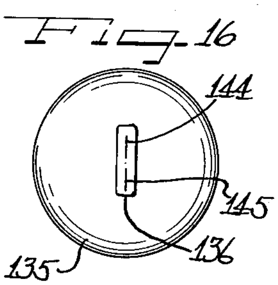
FIGURE 16 is a diagrammatic end elevational view of the head of FIGURE 15.
Figure 17:
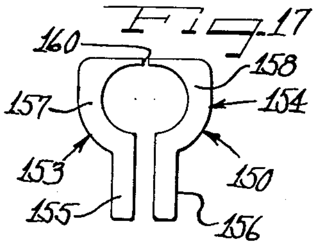
FIGURE 17 is a diagrammatic side elevational view of washer type pole pieces suitable for use with the head of FIGURE 15.

In FIGURES 15, 16 and 17 a short type electron-cloud transducer head is illustrated. The head is generally of the size of a postage stamp and comprises an enlarged cylindrical envelope portion 135 and a flattened capillary portion 136 enclosed in the Mumetal shield 138 in a manner similar to the head of FIGURE 2. The electron gun structure comprises a filament 139, cathode 140, first grid structure 141, second grid structure 142 and converging anodes 144 and 145. As indicated in FIGURE 16, the anodes 144 and 145 are very thin in conformance with the capillary portion 136 of the envelope.

For defining a magnetic field in the capillary portion of the tube for inter-action with the stream of electrons, a thin washer-like pole piece structure 150 is provided which is secured at 151 to the shield 138. The shield is, of course, provided with a non-magnetic opening for receiving the pole structure 150 so that the pole structure is magnetically isolated from the shield. As best seen in FIGURE 17, the pole structure 150 comprises a pair of pole pieces 153 and 154 having closely spaced pole portions 155 and 156 for extending on opposite sides of the flattened capillary 136 of the tube, and have more widely spaced portions 157 and 158 terminating in the tape receiving extremities closely spaced to define a pick-up gap 160. As will hereafter be discussed, the pole piece structure 150 is preferably placed at the base of the capillary portion as indicated in FIGURE 15 for best control of the electron stream. As in the embodiment of FIGURE 2, the shield and the pole structure is preferably separate from the tube, so that the tube is removable for replacement.

Figure 18:
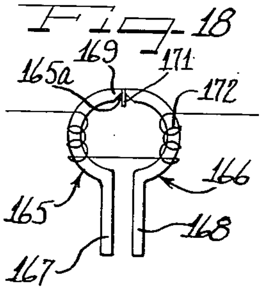
FIGURE 18 is a diagrammatic front elevational view of a modified form of pole structure and indicating the manner in which recording windings may be applied to the pole pieces, the pole pieces being adapted for play-back from a wide channel tape record member.
Figure 19:
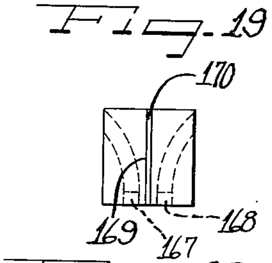
FIGURE 19 is a diagrammatic top plan view of the structure of FIGURE 18.
Figure 20:
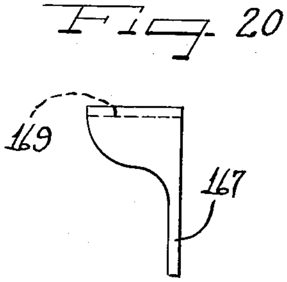
FIGURE 20 is a diagrammatic side elevational view of the structure of FIGURE 18.

FIGURES 18, 19 and 20 illustrate a modified pole piece configuration adapted for cooperation with a wide channel recording and comprising pole pieces 165 and 166 having closely spaced pole portions 167 and 168 for fitting on opposite sides of the capillary portion of the tube and having wide pole faces such as 169 in FIGURE 20 defining an extended pick-up gap 170. As indicated in FIGURE 18, the pole pieces 165 and 166 may be tapered as at 165a and have a non-magnetic spacer 171 defining a non-magnetic gap. The head may be provided with windings 172 to allow use of the head as a record or even an erase head. The pole piece configuration of FIGURE 17 could also be provided with such recording windings if desired.

Figure 22:
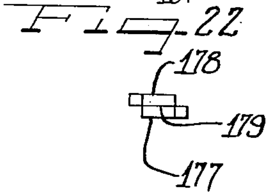
FIGURE 22 is a diagrammatic plan view of the structure of FIGURE 21.
Figure 23:
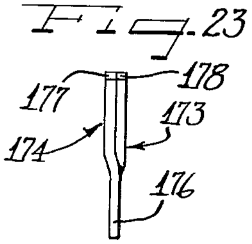
FIGURE 23 is a diagrammatic side elevational view of the structure of FIGURE 21.
Figures 21, 24:
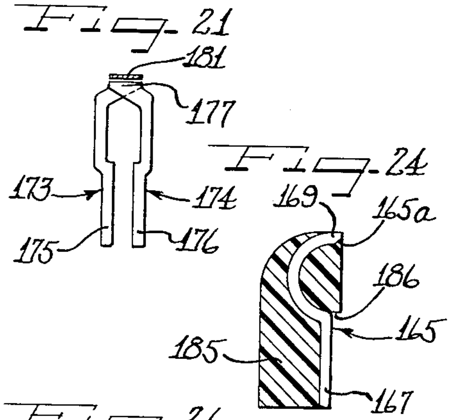
FIGURE 21 is a diagrammatic front elevational view of a third form of pole piece structure utilizing overlapping pole pieces.
FIGURE 24 is a diagrammatic vertical sectional view illustrating a half of a pole mounting structure constructed by resin embedding and adapted for mounting the poles of FIGS. 18–20.

FIGURES 21, 22 and 23 illustrate a further modified form of pole piece construction wherein the pole pieces 173 and 174 have closely spaced portions 175 and 176 for fitting over the tube capillary as usual; however the pole pieces have overlapping pole portions 177 and 178 defining an extended gap 179 for accommodating a relatively wide tape indicated diagrammatically at 181.

Figure 25:
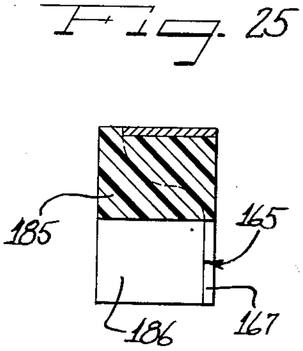
FIGURE 25 is a transverse sectional view of the structure of FIGURE 24.

FIGURES 24 and 25 illustrate a pole mounting structure for the poles of FIGURES 18, 19 and 20 wherein each pole piece such as the pole piece 165 is embedded in a resin material 185 which is cut away as indicated at 186 to accommodate the capillary portion of the tube such as the portion 136 in FIGURE 15. It will be understood that a half of the assembly such as shown in FIGURE 24 is placed on each side of the capillary section 136 in FIGURE 15 to provide a pole piece configuration similar to that indicated in FIGURE 18.

Figure 26:
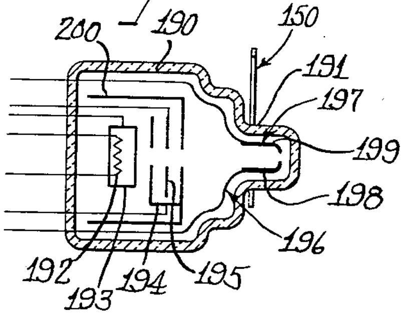
FIGURE 26 is a diagrammatic longitudinal sectional view illustrating a short type electron-cloud transducer head provided with a shield or baffle element for protecting the anodes from stray beam currents.

FIGURE 26 illustrates a tube comprising an enlarged envelope portion 190, and a capillary portion 191 for receiving a pole piece construction such as 150. The tube has a filament 192, cathode 193, first grid structure 194, and second grid structure 195. However, in this embodiment, the anodes 196 and 197 follow a somewhat devious course and include elongated parallel portions 198 and 199 in the capillary section 191. The anodes are of the thin construction such as indicated in FIGURE 16. For protecting the anodes 196 and 197 from stray beam currents, a shield or baffle element 200 is provided at the potential of the first grid and interposed between the grid structure and the adjacent portions of the anodes.

Figures 27, 28, 29, 30, 31:
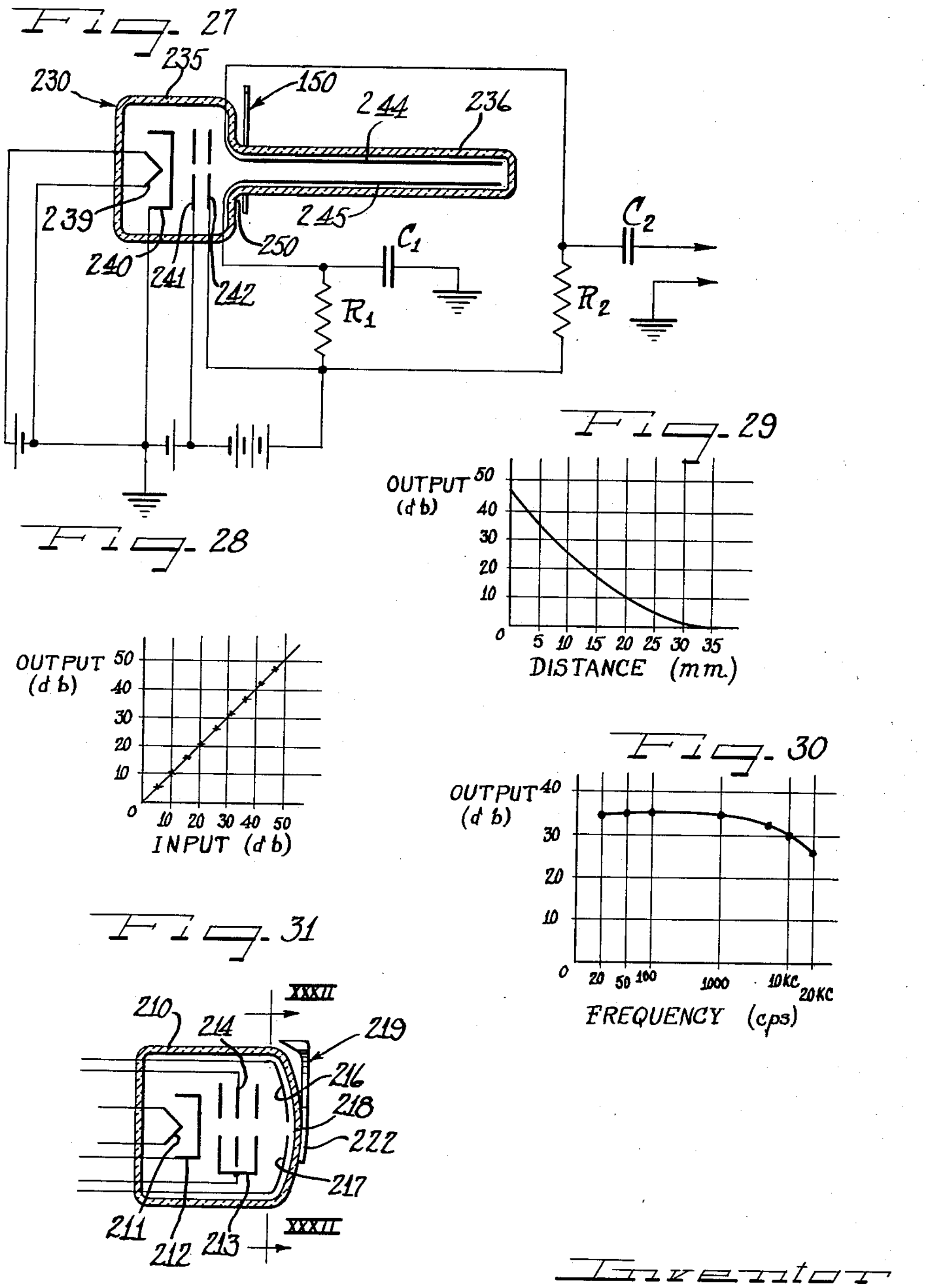
FIGURE 27 is a diagrammatic illustration of a circuit for use with an electronic transducer head similar to that of FIGURE 1, but having the pole pieces of FIGURE 17.
FIGURE 28 is a plot of output as a function of input for the head of FIGURE 27 and indicating the wide range of linearity of the head construction.
FIGURE 29 is a plot of relative output as a function of the position of the pole pieces along the capillary throat of the tube of FIGURE 27.
FIGURE 30 is a frequency response curve for the head of FIGURE 27.
FIGURE 31 is a diagrammatic longitudinal sectional view of a flat face type electron-cloud transducer head according to the present invention.

FIGURE 27 illustrates a suitable circuit for an electron-cloud transducer tube 230 having an envelope 235 with a reduced cross section elongated capillary portion 236 and a filament 239, cathode 240, first grid 241, second grid 242, and anodes 244 and 245. Typical operating values for the circuit of FIGURE 27 are as follows: Filament voltage, 9 volts; cathode, zero volts; first grid, 2.9 volts; second grid, 100 volts, anode 244, 39 volts; anode 245, 41 volts; condensers $C_1$ and $C_2$, 0.1 microfarad; resistors $R_1$ and $R_2$, 600,000 ohms. With these values the anode currents from anodes 244 and 245 were each 110 microamperes. Resistors $R_1$ or $R_2$ or both may be variable to adjust for balance, although the system works well with as much as a 2 to 1 unbalance in anode currents. The system is also not critical with respect to operating grid and anode voltages; for example, dropping the anode voltage to about 3 volts reduced the anode current to 46 microamperes, but still gave good sensitivity (at reduced power handling capacity). Grid voltages can be changed by a factor of 2 to 1 or more without serious harm. If the filament is operated from an alternating current source hum may be reduced by operating the center tap of the filament about 25 volts positive with respect to the cathode.

Operation of the anodes below 100 volts, and preferably below 50 volts is advantageous because secondary emission effects are reduced, deflection sensitivity is increased, and the noise level is lower.

For response to D.C., condensers $C_1$ and $C_2$ may be omitted, anode 245 tapped directly at operating potential and anode 244 directly coupled to the D.C. amplifier circuits, or better still push-pull direct coupled output from anodes 244 and 245 may be employed. Transverse recording is desirable if extremely long wavelengths are to be sensed. It has been found that great sensitivity can be obtained by thin pole pieces such as 150 illustrated in FIGURE 17, as close to the base 250 of the capillary 236 as possible. An important feature of the invention is to have the electron control elements at a positive potential to attain and direct the electron stream in conjunction with the magnetic deflection means, and anode elements at a lower positive potential than the most positive control element. A further important feature of the invention is the provision of a transducer tube with an anode voltage below 100 volts and preferably below 50 volts. For example, one tube according to the present invention operated in an optimum manner at an anode voltage of about 35 volts.

To illustrate the stability of the tube, the following readings were taken with filament voltage and signal input constant:

| Supply voltage | Output in db |
|---|---|
| 150 | 29 |
| 125 | 29 |
| 115 | 29.2 |
| 100 | 28.6 |
| 75 | 27.2 |
| 50 | 24.2 |

In all forms it is important to baffle and isolate the filament and cathode emission in such a way that only the beam coming through the aperture strikes the anode electrodes. Hum, noise, unbalance, and insensitivity will result from unwanted stray emission. The heater should be non-inductively wound, with the leads and connections closely spaced. A high voltage low current heater should be used, thus allowing sufficient wattage at low heater current, and reducing fields due to heater current.

It is desirable to cover the glass capillary portion or end of the tube with Aquadag and lampblack, for low secondary emission and for electrostatic shielding purposes. The same effect can be obtained with a conductive electrode properly coated and positioned.

FIGURE 28 represents a plot of output in db from anode 244 (taking zero db at one millivolt) as a function of input in db at 1000 cycles.

FIGURE 29 is a plot of the relative output in db as a function of the distance of the pole pieces structure 150 from the base 250 of the capillary portion 236. The plot illustrates the decrease in sensitivity as the pole piece structure is moved along the capillary portion 236 away from the enlarged envelope portion 235. The plot thus shows the desirability of having the pole piece structure 150 as close to the base of the capillary portion as possible.

In FIGURE 30 is illustrated a frequency response curve of relative output in db as a function of frequency in cycles per second. The curve is taken for a 0.014 inch thick Mumetal head similar to that in FIGURE 27. The fall off of response at high frequency is due to core loss. Heads of ferrite material would insure a response to the megacycle range.

Figures 32, 33, 34, 35, 36, 37, 38, 39, 40, 41, 42, 43, 44:
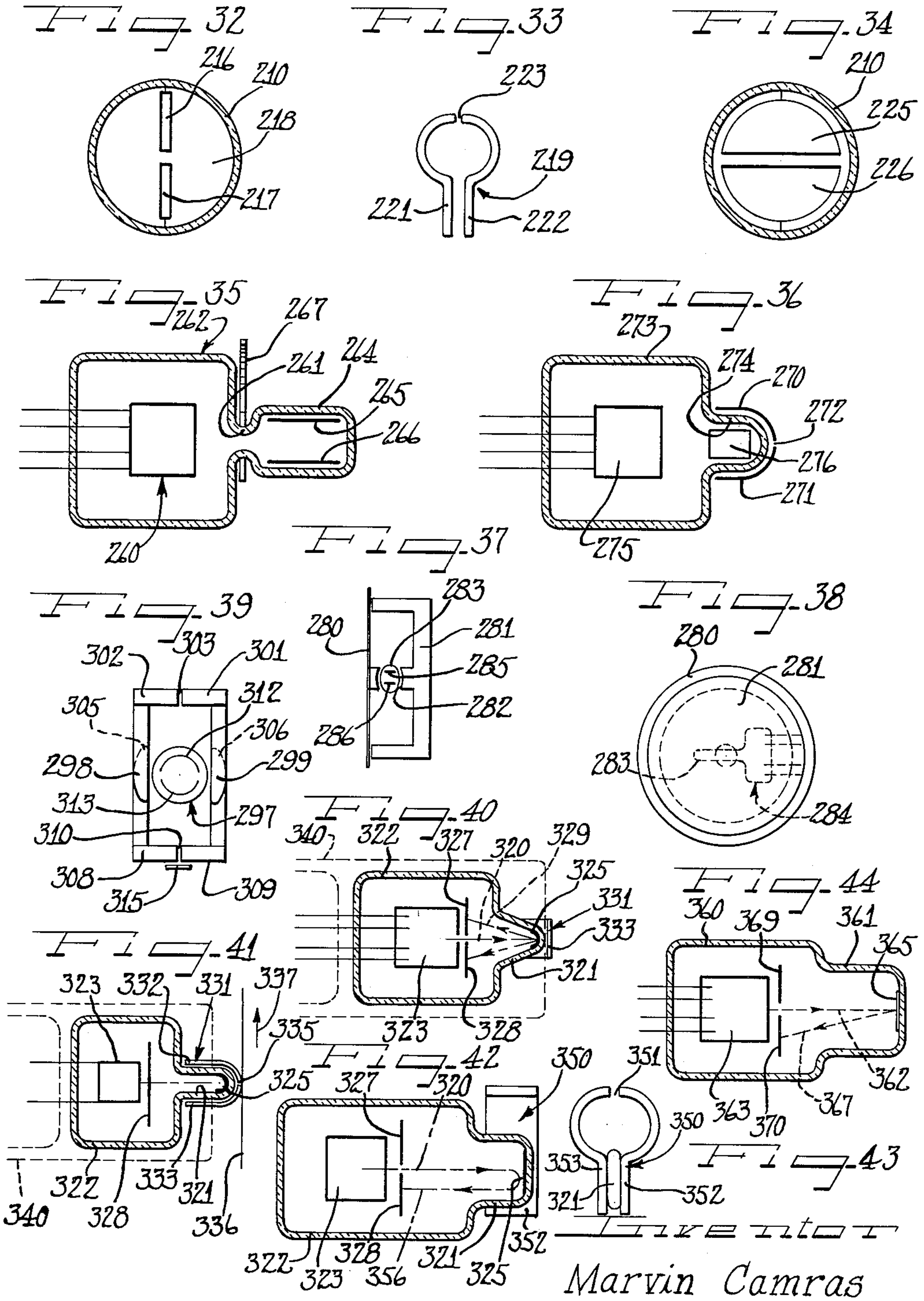

In FIGURES 31, 32 and 33 is illustrated a flat face type electron-cloud transducer head having a generally cylindrical envelope 210 with the usual filament 211, cathode 212, first and second grids 213 and 214, and with generally rectangular anodes 216 and 217 on the flat end face 218 of the tube. The pole piece configuration 219 is disposed against the exterior face of the end 218, and the electron stream is influenced by the fringing field between the pole pieces 221 and 222, which field is sufficient to cause deflection of the electron cloud in the tube shown and to produce an output from the tube. As indicated in FIGURE 33, the pole structure 219 includes a non-magnetic gap 223 for receiving a record member thereacross to induce the signal field across the poles 221 and 222.

FIGURE 34 illustrates an alternative configuration of the anodes wherein the anodes comprise half round plates 225 and 226 at the end of the tube 210.

FIGURE 35 illustrates a still further modified form of the electron-cloud transducer head of the present invention having a suitable electron beam structure 260 for directing a stream of electrons through the constricted neck portion 261 of the envelope 262, the anode portion of the tube 264 having anodes 265 and 266 along opposite sides thereof. A pole piece structure 267 similar to 150 in FIGURE 17 deflects the electron beam in accordance with a recorded signal as in the previous embodiments.

FIGURE 36 illustrates a short capillary design with the pole pieces 270 and 271 defining a field for interaction with the stream of electrons and having a gap 272 for cooperation with a record member traveling thereacross. The envelope 273 is provided with a short capillary portion 274 receiving the pole pieces 270 and 271 and has any suitable electron gun structure 275, and anodes such as 276.

In FIGURES 37 and 38 is illustrated a microphone utilizing an electron-cloud tube as the transducing element wherein the reference numeral 280 designates a diaphragm of magnetic material to be set in vibration relative to a magnet structure 281 by means of a sound wave to vary the magnetic field a a gap 282 in the magnetic circuit of the device. An elongated capillary portion 283 of the electron-cloud tube 284 extends into the gap 282 for sensing the varying magnetic field and to convert the same into an electrical signal at the anodes 285 and 286 as in the previous embodiments.

Similarly as indicated in FIGURE 39, the electron-cloud tube of the present invention is suitable for use as a phonograph pick-up, vibration pick-up and the like, the tube 297 being substituted for the conventional coil, and sensing any unbalance between the magnetic field produced by the upper poles 298, 299 of the upper magnetic circuit including series aiding permanent magnets 301, 302 and gap 303, and the field produced by the lower poles 305, 306 of the lower magnetic circuit including series aiding permanent magnets 308, 309 and non-magnetic gap 310. These magnetic circuits may be spaced from each other longitudinally of the beam, so that the beam is deflected first one way by one circuit, and then the opposite way by the second circuit. The upper and lower magnetic circuits may be initially balanced to produce equal and opposite magnetic fields with respect to the transducer 297 so that the electron stream will be evenly distributed between the anodes 312 and 313 thereof. The magnetic fields may be unbalanced by movement of the magnetic member 315 controlling the reluctance of the gap 310, and it will be understood that the member 315 may be vibrated by a phonograph needle or other similar vibration pick-up device. In a modified form of this pick-up, pole pieces 298, 299, 305, 306 would be bent or shaped so that gaps 303 and 310 were on opposite sides of member 315, thus eliminating any unbalanced forces on the vibrating element 315. Thus the electron-cloud transducer tube of the present invention can be used wherever a magnetic type pick-up is applicable, by substituting a gap and capillary for the conventional coil.

In FIGURE 40 is illustrated a reflection type transducer head wherein an electron stream indicated at 320 is directed into a capillary portion 321 of a tube 322 by means of an electron gun structure 323, and is reflected from the capillary portion by means of a surface 325 at the end of the capillary at cathode potential or slightly negative with respect to the cathode. The surface 325 may be provided by an Aquadag coating on the capillary wall, or the capillary wall itself may be maintained at cathode potential under suitable conditions. The capillary section 321 thus constitutes a low velocity region, the electrons traveling from this region in the reverse direction to the anodes 327 and 328 along paths such as indicated at 329.

As indicated in FIGURE 40 and 41, a magnetic field may be applied to the capillary section 321 to deflect the returning electron beam 329 by means of a magnetic pole structure indicated at 331, the pole structure comprising a pair of poles 332 and 333 on opposite sides of the capillary portion 321 and having a non-magnetic gap 335 for receiving a record member 336 thereacross in the direction of the arrow 337 in FIGURE 41. As in the previous embodiments, the presence of a magnetic field between the poles 332 and 333 causes electron flow to one of the anodes 327 or 328 to predominate to produce an electric potential between the anodes. The electron gun construction and the circuit connections previously described, such as in FIGURES 11, 12 and 27 are directly applicable to the modified tubes of FIGURES 40 and 41, with the addition, if necessary of a grounding or biasing connection to surface 325. A magnetic shield 340 is indicated which may be similar to the shield shown in FIGURE 2. It will be appreciated that the pole structure 331 serves to shield the capillary portion of the tube from stray magnetic fields.

It will be understood that the path of the reflected beam indicated diagrammatically in FIGURE 40 is merely for illustration and that different paths will be followed depending on operating conditions and magnetic pole configuration.

Instead of the anodes 327 and 328, the input of an electron multiplier can be substituted and the transducer output taken from the output of the multiplier. This eliminates Johnson noise and other effects that would result from ordinary amplification of the anode output. If the multiplier input is partially shaded from the net return beam, a single multiplier section will respond to variations in positon of the return beam.

FIGURES 42 and 43 indicate a transducer tube substantially identical to that shown in FIGURES 40 and 41 and the same reference numerals have been applied to corresponding parts. However, in this case a pole structure 350 is utilized having a relatively broad gap 351, FIGURE 43, disposed radially outwardly of the tube rather than at the end face thereof as in FIGURE 41. The pole structure has relatively wide pole faces 352 and 353 for defining a magnetic field for influencing the reflected stream of electrons 356, and in FIGURE 42, it is assumed that a magnetic field exists between the poles 352 and 353 so that flow of reflected electrons is predominately to the anode 328. Here again the diagrammatically illustrated electron flow path is merely by way of illustration.

In FIGURE 44 is illustrated a further form of a reflected type transducer head wherein an envelope 360 has a capillary portion 361 with a stream of electrons 362 directed by an electron gun structure 363 against a target 365 which is a good secondary emitter. The operation is similar to the embodiment of FIGURE 40, and a similar pole structure may be used for deflecting the secondary stream of electrons 367 for example to anode 370 as indicated.

Those skilled in the art will appreciate that electric circuits such as illustrated in FIGURES 11 and 12 may be utilized to sense electron flow variation at the anodes of any of the illustrated embodiments.

It will be understood that modifications and variations may be effected without departing from the scope of the novel concepts of the present invention.

I claim as my invention:

1. An electromagnetic transducer device comprising an envelope, magnetic pole means defining a magnetic field extending into a region of said envelope, means for directing a stream of electrons into said region, a surface in said region at a potential to reject said stream of electrons, an electrode spaced from said surface and at a potential to attract said electrons in a generally reverse direction, and means for sensing the effect of said magnetic field on said reverse flow of electrons.

2. A magnetic transducer device comprising an envelope, means for establishing a stream of electrons within said envelope, means entirely external of said envelope disposed to establish a magnetic field for interaction with said stream of electrons, means for varying said magnetic field in accordance with an intelligence signal, means for obtaining an electric output varying in accordance with said field, and means whereby said stream of electrons has a reversal of direction of movement in the region of interaction with said magnetic field.

3. In combination, a magnetic record medium having a signal recorded thereon and a device for electrically reproducing the signal recorded on said record medium comprising an envelope, means for producing a stream of electrical charges in said envelope, said envelope having a constricted portion providing an external wall surface in close proximity to said stream of electrical charges, means defining a magnetic flux path for the magnetic signal flux of the record medium extending from the record medium through said external wall surface and into the path of said stream of electrical charges in said envelope, and means for retarding the velocity of said stream of electrical charges in the region of intersection thereof with said magnetic flux path.

4. In combination, a magnetic record medium having a signal recorded thereon and a device for electrically reproducing the signal recorded on said record medium comprising an envelope, means for producing a stream of electrical charges in said envelope, said envelope having a constricted portion providing an external wall surface in close proximity to said stream of electrical charges, means defining a magnetic flux path for the magnetic signal flux of the record medium extending from the record medium through said external wall surface and into the path of said stream of electrical charges in said envelope, and means for retarding the velocity of said stream of electrical charges in the region of intersection thereof with said magnetic flux path, said retarding means comprising a control surface within said envelope toward which said stream of electrical charges is directed and which is maintained at a potential to repel said stream of electrical charges to cause a reversal in the direction of movement of said stream of electrical charges near where said magnetic flux path intersects said stream.

5. In combination, a magnetic record medium having a signal recorded thereon and a device for electrically reproducing the signal recorded on said record medium comprising an envelope, means for producing a stream of electrical charges in said envelope, said envelope having a constricted portion providing an external wall surface in close proximity to said stream of electrical charges, means defining a magnetic flux path for the magnetic signal flux of the record medium extending from the record medium through said external wall surface and into the path of said stream of electrical charges in said envelope, and means for retarding the velocity of said stream of electrical charges in the region of intersection thereof with said magnetic flux path, said stream producing means comprising a cathode for emitting a stream of electrons and focusing and accelerating means for directing said stream along a path adjacent said external wall surface, and said retarding means comprising a control surface within said envelope toward which said stream of electrons is directed and which is maintained in the neighborhood of cathode potential.

6. A magnetic transducer device comprising an envelope having an end portion with flat exterior side wall surfaces which are very closely spaced in comparison with other external dimensions of said envelope, means for directing a stream of electrical charges into said end portion of said envelope, and means defining a magnetic flux path for a magnetic signal flux extending through said flat exterior side wall surfaces of said envelope and intersecting the path of said stream of electrical charges, and means for reversing the direction of movement of said stream of electrical charges in said end portion of said envelope.

7. A magnetic transducer device comprising an envelope, means for producing a stream of electrical charges in said envelope, means for coupling to a magnetic record medium defining a magnetic flux path for a magnetic signal flux from the record medium intersecting a region of the path of said stream of electrical charges, and means for retarding the magnitude of the velocity of said stream of electrical charges in said region of the path thereof.

8. A magnetic transducer device comprising an envelope, means for producing a stream of electrical charges in said envelope, means defining a magnetic flux path for a magnetic signal flux intersecting a region of the path of said stream of electrical charges, and means for retarding the velocity of said stream at said region of the path thereof, said retarding means comprising a control surface in said envelope toward which said stream is directed and which is maintained at a potential to repel said electrical charges.

9. A magnetic transducer device comprising an envelope, means for producing a stream of electrical charges in said envelope, means for coupling to a magnetic record medium and defining a magnetic flux path for a magnetic signal flux from the record medium intersecting a region of the path of said stream of electrical charges, means for reversing the direction of movement of said stream of electrical charges near said region of the path of said stream, and means for electrically sensing the effect of said signal flux from the record medium on said stream of electrical charges.

10. A magnetic transducer device comprising an envelope, means for producing a stream of electrical charges in said envelope, means defining a magnetic flux path for a magnetic signal flux intersecting a region of the path of said stream of electrical charges, and means for retarding the magnitude of the velocity of said stream at said region of the path thereof, said stream producing means comprising a cathode for emitting a stream of electrons and focusing and accelerating means for directing said stream along its path within said envelope, and said retarding means comprising a control surface adjacent said region of said path and which is maintained in the neighborhood of cathode potential.

11. A magnetic playback head for electrically reproducing a magnetic signal comprising an envelope, a surface in said envelope, means for directing a stream of electrical charges toward said surface comprising accelerating means having an accelerating voltage of a value to accelerate said electrical charges toward said surface, means for applying a retarding voltage to said surface which is less than said accelerating voltage, means whereby said surface is operative to retard the acceleration of said electrical charges to create a cloud of electrical charges in a region of said envelope when said retarding voltage is applied to said surface, means for applying a magnetic signal field to said cloud of electrical charges directly at said region, and means for electrically sensing the effect of said magnetic signal field on said electrical charges.

12. A magnetic playback heat for electrically reproducing a magnetic signal comprising an envelope, a surface in said envelope, means for directing a stream of electrical charges toward said surface comprising accelerating means having an accelerating voltage of a value to accelerate said electrical charges toward said surface, means for applying a retarding voltage to said surface which is less than said accelerating voltage, means whereby said surface is operative to retard the acceleration of said electrical charges to create a cloud of electrical charges in a region of said envelope when said retarding voltage is applied to said surface, means for applying a magnetic signal field to said cloud of electrical charges directly at said region, and means for electrically sensing the effect of said magnetic signal field on said electrical charges, said magnetic signal field applying means comprising a magnetic core entirely external of said envelope defining a magnetic flux path having its shortest length within said envelope extending directly through said region and being entirely in space within said envelope, and the interior of said envelope being entirely free of magnetic material in said region.

13. A magnetic playback head for electrically reproducing a magnetic signal comprising an envelope, a surface in said envelope, means for directing a stream of electrical charges toward said surface comprising accelerating means having an accelerating voltage of a value to accelerate said electrical charges toward said surface, means for applying a retarding voltage to said surface which is less than said accelerating voltage, means whereby said surface with said retarding voltage applied thereto is operative to create a cloud of electrical charges having a substantially minimum velocity amplitude in a region of said envelope remote from said accelerating means, means for applying a magnetic signal field to said cloud of electrical charges with the maximum of the signal field in the envelope directly intersecting said region where said electrical charges have substantially their minimum velocity, and means for electrically sensing the effect of said magnetic signal field on said electrical charges.

References Cited in the file of this patent

UNITED STATES PATENTS

| | | |
|---|---|---|
| 1,943,109 | Coolidge | Jan. 9, 1934 |
| 1,998,465 | Severy | Apr. 23, 1935 |
| 2,165,307 | Skellett | July 11, 1939 |
| 2,185,138 | Wolff | Dec. 26, 1939 |
| 2,668,190 | Sziklai | Feb. 2, 1954 |
| 2,720,558 | Skellett | Oct. 11, 1955 |
| 2,724,021 | Goeppinger et al. | Nov. 15, 1955 |
| 2,725,430 | Gratian et al. | Nov. 29, 1955 |